United States Patent [19]

Mirsch et al.

[11] 4,212,135
[45] Jul. 15, 1980

[54] METHOD OF ADAPTIVE CONTROL OF A RECESSING CYCLE ON A GRINDING MACHINE AND APPARATUS THEREFOR

[75] Inventors: Miroslav Mirsch; František Rosberg; Miroslav Růžička, all of Prague, Czechoslovakia

[73] Assignee: Tos Hostivar, narodni podnik, Prague, Czechoslovakia

[21] Appl. No.: 14,557

[22] Filed: Feb. 23, 1979

[30] Foreign Application Priority Data

Feb. 23, 1978 [CS] Czechoslovakia ................ 1137-78

[51] Int. Cl.$^2$ ..................... B24B 49/16; B24B 1/00
[52] U.S. Cl. ................. 51/165.71; 51/165.77; 51/281 R
[58] Field of Search ........... 51/165 R, 165.71, 165.77, 51/281 R

[56] References Cited

U.S. PATENT DOCUMENTS

| | | | |
|---|---|---|---|
| 3,964,210 | 6/1976 | Moritomo | 51/165.77 |
| 4,018,010 | 4/1977 | Pozzetti | 51/165.71 |
| 4,053,289 | 10/1977 | Tatsumi | 51/165.77 |
| 4,117,634 | 10/1978 | Sugita | 51/165.77 |
| 4,118,900 | 10/1978 | Moritomo | 51/165.77 |

*Primary Examiner*—Harold D. Whitehead

[57] ABSTRACT

Method of adaptive control of a recessing cycle on a grinding machine where the roughing is terminated, if the allowance drops to a value determined from the characteristic value derived from the preceeding grinding cycle and from the allowance at the beginning of grinding so that the allowance for finish grinding may have a desired value. The material removal speed at the beginning and at the end of sparking conform to a requested functional relationship. The grinding operation is ended according to the final dimension of the machined part. The finish grinding is carried out, if the requested functional relationship of removal speeds and of the preselected accuracy are not maintained, or if the removal speed drops under the preselected value. If the allowance is smaller than the preselected value the characteristic value or values for the next cycle are derived from allowances at the beginning of the cycle, at the end of sparking and from the effectively reached relation of removal speeds at the beginning and at the end of sparking. The limit stresses of the system machine tool workpiece are the transmitted characteristic value into the next cycle. The functional relationship between the removal speed at the beginning and at the end of sparking is represented by a ratio of these values.

For the ending of roughing in the first cycle, the preselected limit stresses must have such a value, that the preselected value may be greater or identical with the maximum allowed limit stresses.

8 Claims, 6 Drawing Figures

METHOD OF ADAPTIVE CONTROL OF A RECESSING CYCLE ON A GRINDING MACHINE AND APPARATUS THEREFOR

The invention relates to a method of adaptive control of a recessing cycle on a grinding machine the aim of which is to reach the determined geometrical properties within the minimum interval, and apparatus therefor.

Grinding machines, that are to produce a workpiece of an accurate dimension, are usually provided with a control signal which is derived from a dimensional tracking of a workpiece during the grinding operation. Devices, which are applied for this method, so called tracking meters, utilize measured values for a control of machines so that when dimensions of the workpiece are attained, all grinding procedures are successively switched over. This control method provides sufficient dimensional accuracy of the workpiece, but in the grinding process there are considerable reserves, as the preadjusting of individual grinding procedures must be carried out with a safety aspect. which might insure that the desired dimension of the workpiece is produced even under varying conditions such as instability of infeed speeds, improper initial condition of the machined part, stresses during machining operations, etc.

Control parameters are adjusted so that, taking the mentioned conditioned into consideration, the quality of the workpiece would be maintained. The setting up of control parameters is not the optimum one, because of the mentioned reason, and it depends upon the experience of the attending worker.

A grinding cycle applied for recess grinding of outer surfaces usually consists of a roughing step, a sparking step and finishing step. The grinding in the roughing part of the cycle is carried out during a mutual infeed of the workpiece and grinding wheel at a roughing speed. When sparking, the grinding is carried out without infeed and its purpose is to decrease stresses of the system. When finishing, the grinding is carried out at a lower speed. The sparking is usually controlled by means of a timer, the pre-adjusting of which must be done with some reserve, in order to take into account the above-mentioned variable conditions.

The purpose of the roughing part of the cycle is to remove most of the material in this interval. The purpose of sparking as well as of finish grinding is to achieve the desired quality and dimension of the workpiece. It is evident, that the aim of an optimum adjustment of a grinding cycle is to adjust conditions for grinding so that the sparking and finish grinding are completed as soon as possible, while maintaining the desired quality of grinding and dimensional accuracy of the workpiece.

Hitherto known methods of so-called adaptive control of a grinding cycle attempt to reach the required geometrical accuracy of a workpiece.

There is known a method and apparatus, which minimize the interval of sparking by monitoring the rate of material removal during sparking and by automatically switching on the finish grinding when the rate of removal drops below a predetermined value. This method of grinding machine control solves the problem of minimizing the sparking time, but, of course, it does not take into account the other unknown conditions encountered during grinding.

There is also known a method of grinding and apparatus therefor, by which the finishing part of the grinding cycle is minimized. According to this known method the roughing infeed is stopped by means of an auxiliary pick-up situated on the grinding machine. The position of the pick-up is modified by the preceeding grinding cycle. A drawback of this method resides in the necessity to build in a new auxiliary pick-up, requiring some adaptations of the machine design. Another drawback resides in the fact, that this auxiliary pick-up cannot follow all differences in stresses which arise by the effects of uneven grinding.

There are also known expensive and complicated systems of an adaptive control of a grinding process which utilize a computer and auxiliary pressure and position pick-ups. These systems are able to follow various grinding process variations according to applied algorhythms. A common problem of all such systems is high cost. A considerable drawback of them is that they cannot cooperate with ordinary types of grinding machines, e.g. provided with hydraulically operated infeed mechanisms; they need a complicated grinding machine provided with electrically controlled infeed mechanisms.

Some of the mentioned drawbacks may be obviated by a method of adaptive control of a recessing cycle on a grinding machine according to the invention, the aim of which is to reach ordered geometrical properties of a machined workpiece within a minimum interval of time. The principle of the invention resides in the fact, that the roughing is terminated, if the allowance for machined parts drops to a dimension which is determined from a characteristic value or values derived from at least one of the preceeding grinding cycles and from the allowance at the beginning of the grinding cycle, so that the allowance for finish grinding may have a zero value or a requested one and the speed of material removal at the beginning and at the end of the sparking provides the required functional relation; the grinding operation is terminated according to the final dimension of the machined part and the order for finish grinding is carried out only if the required functional relationship of material removal speeds is not maintained at the beginning and at the end of sparking with a preselected accuracy, or if the material removal speed drops under the preselected speed. Eventually if the allowance on the machined part is smaller than the preselected value, then the characteristic values for the next grinding cycle or cycles are derived from the allowance at the beginning of the cycle, from the allowance at the end of roughing, from the allowance at the end of sparking and from the functional relationship of material removal speeds at the beginning and at the end of sparking. The characteristic value transmitted into at least one next grinding cycle may be advantageously the only one and it is represented by limit stresses of the system machine tool workpiece. The functional relationship between the material removal speed at the beginning and at the end of sparking may be the ratio of these values. To derive the allowance value for the end of roughing in the first grinding cycle, the limit stresses may be preadjusted so that the preadjusted value may be greater or equal to the maximum allowed limit stresses.

An apparatus according to the invention comprises a pick-up head which touches the machined workpiece, a dimensional encoder unit, and a cycle control unit. The principle of the apparatus resides in the fact that the output of the pick-up head is connected to the input of the dimensional encoder unit. The output of the dimensional encoder unit is connected to the first collecting input of an analysis unit, to the first pick-up input of a synthesis unit, to the first sorting input of the comparator unit and to the input of a removal speed unit. The output of the removal speed unit is connected to the second starting input of the comparator unit and to an input of a function unit. An output of the function unit is connected to the third sorting input of the comparator unit and to the second collecting input of the analysis unit. An output of the analysis unit is connected to the second pick-up input of the synthesis unit and an output of the synthesis unit is connected both to the first reference input of the comparator unit and to the third collecting input of the analysis unit. The first keying input of the analysis unit is connected to the first control output of the cycle control unit. The second keying input of the analysis unit is connected to the second control output of the cycle control unit. The third keying input of the analysis unit is connected to the third control output of the cycle control unit and the fourth keying input of the analysis unit is connected together with the fifth keying input of the synthesis unit to the fourth control output of the cycle control unit, the fifth control output of which is connected to a locking input of the comparator unit from which a feedback signal is connected from its first auxiliary output to an auxiliary control input of the cycle control unit. The second auxiliary output of the comparator unit is connected to a sampling input of the function unit. The first input of the comparator unit is connected to an input of the roughing control circuits of action units of the grinding machine; the second output of the comparator unit is connected to an input of the cycle end control of the action units of the grinding machine and the third output of the comparator unit is connected to an input of the finish grinding control of the action units of the grinding machine. The synthesis unit is provided with a first auxiliary input and with a second auxiliary input. The analysis unit is provided with an order input. The cycle control unit is provided with a control input and the comparator unit is provided with a second reference input, a third reference input, a fourth reference input and a fifth reference input.

The advance in the art provided by the invention results from the fact, that the method of adaptive control of a recessing cycle on a grinding machine according to the invention makes it possible to keep up the optimum adjustment even at variable secondary conditions of grinding such as thickness variations of the allowance for grinding, a successive change of quality of an abrasive wheel because of wear, a successive change of the roughing infeed speed of the grinding machine and a successive change of the cutting speed of the abrasive wheel.

An important advantage of the method of adaptive control according to the invention is the fact, that this new method can be applied on all known grinding machines without any design adaptations and without any additional pick-ups.

A further advance in the art provided by an apparatus operating according to the method of the invention resides especially in the fact, that the apparatus is set up for changing working conditions by itself without any action of an attending worker, and the setting-up is optimized as to geometrical properties within a minimum interval despite variable secondary grinding conditions.

A secondary advantage of these properties, but a very important one with respect to attendance, is the fact that such an apparatus may be designed without control elements by means of which the process of the grinding cycle is set up in hitherto known devices. The control level is increased by requirements for supervision of the apparatus are decreased, and the operation of the apparatus is simpler than for hitherto known devices.

An other important advance provided by the apparatus according to the invention is the fact, that it derives its measuring signals from an ordinary pick-up head of a tracking meter of the type usually installed on the grinding machine. Information from this ordinary pick-up head, utilized in a new way, are sufficient for adaptive control of the grinding machine without any other additional pick-up.

In order that the invention may be clearly understood and readily carried into effect, a preferred embodiment thereof is, by way of example, hereinafter more fully described and illustrated in the accompanying drawings in which.

An adaptive control of a recessing cycle on a grinding machine is carried out when applying the method according to the invention so that the roughing terminates, if the allowance on the machined parts drops to the dimension which is determined from a characteristic value, or from values derived at least in one of the preceeding grinding cycles and from the allowance at the beginning of the grinding cycle, so that the allowance for finish grinding may have a zero value or a requested one, and the material removal speed at the beginning and at the end of the sparking may provide the requested functional relationship. The grinding operation is terminated according to the final dimension of the machined part and the order for finish grinding is carried out only if the requested functional relationship of material removal speeds is not maintained at the beginning and at the end of sparking with a preselected accuracy, or if the material removal speed drops under the preselected value of the speed. Eventually if the allowance on the machined part is smaller than the preselected value, then the characteristic value or values for the next grinding cycle or cycles are derived from the allowance at the beginning of the cycle, from the allowance at the end of roughing, from the allowance at the end of sparking and from the functional relationship of material removal speeds at the beginning and at the end of sparking, which was effectively reached. Then it is possible to operate the apparatus so that the characteristic value transmitted into the next grinding cycle is advantageously the only one and it is represented by limit stresses of the system machine tool workpiece. The apparatus may also be operated so that the functional relationship between the material removal speed at the beginning and at the end of sparking there is applied as the ratio of these values. The apparatus may also be operated in such a way, that, to derive the allowance value from the end of roughing in the first grinding cycle, the limit stresses are preadjusted, viz. so that the preadjusted value may be greater or equal to the maximum allowed limit stresses.

An application of the method according to the invention shows an example, where the following mathematic relations are valid for a recess grinding with a sufficient accuracy:

roughing area $$d = D_o - VT(-e^t + \frac{t}{T} - 1) \qquad (1)$$

sparking area $$d = D_1 - VT(1 - e^{\frac{t_1}{T}})(1 - e^{\frac{t-t_1}{T}}) \qquad (2)$$

$D_0$ allowance at the beginning of the grinding cycle
$D_1$ allowance at the beginning of sparking
d instantaneous value of allowance
V roughing speed
T constant of the system machine tool workpiece
$t_1$ time at the beginning of sparking
t time For this mathematical model of recess grinding, the product VT has a physical meaning of limit stresses of an N mechanical system machine tool workpiece and it is possible to specify a definition relationship $$N = VT \qquad (3)$$

A relative inspection of a development of geometrical properties of the machined surface may be carried out with a sufficient accuracy by tracking the ratio of material removal speeds at the beginning and at the end of sparking. The value of the ratio of these speeds, under supposition of a constant roughing speed, corresponds with geometrical properties of the machined surface.

If one applies a definition relation $$V_2 = k/V_1 \qquad (4)$$

$V_1$ speed of the material removal at the beginning of sparking
$V_2$ material removal speed at the end of sparking
then the equations (1) and (2) may be transformed as follows:

$$D_0 - D_1 = N(t_1/T) - (1 - e^{t_1/T}) \qquad (5)$$

$$D_1 - D_2 = N(1 - e^{t_1/T})(1 - k) \qquad (6)$$

$D_2$ Allowance for finish grinding

When applying the method according to the invention, let us assume, that at the beginning of every working cycle there is at hand a derived or determined value N, a measured value $D_0$ and requested values $k = k_1$ and $D_2 = D_{20}$. When putting these values in the equation (5) and (6), one calculates $D_1$ and so the value of the allowance is found in which the roughing must be finished. If one determines $D_{20}$ so that the finish grinding may have a zero value or that it may have a minimum selected value, and the ordered geometrical properties of the machined part contain the value $k_1$, then one reaches the task of machining in a minimum interval and the working cycle is an optimum one.

When each working cycle is over, one has at hand the measured values $D_0$, $D_1$, $D_2$ and k. Putting these values in equations (5) and (6), one calculates N, i.e. the limit stresses of the most recently completed grinding cycle. From its definition (3) it is evident that it includes properties of the system within the scope of the chosen model and that it does not depend upon $D_0$.

If one continues to assume that the quantities V and T change relatively in the successive grinding cycles, it is evident, that the quantity N may be applied as a characteristic value for next cycle or for several cycles. In practice this supposition is usually fulfilled. It is possible, without difficulty, to determine, for a wide range of workpieces, even a requested value of the ratio of the material removal speeds at the beginning and at the end of sparking ($k_1$) and the requested value of the allowance for finish grinding ($D_{20}$). In this way an apparatus for a recessing cycle control on grinding machines applying the method according to the invention may be set up by itself and may be adaptive.

Figure 1:
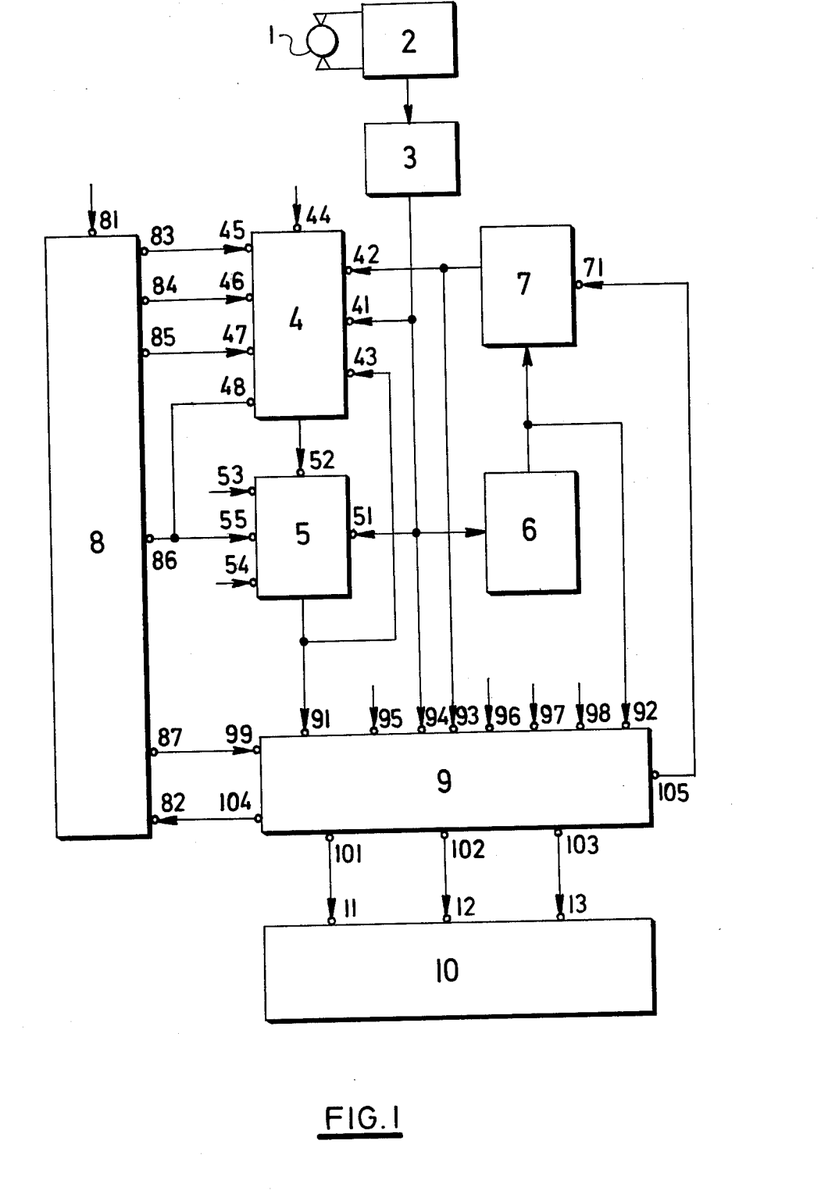
FIG. 1 shows a block diagram of an arrangement for recessing cycle control of a grinding machine.

An example of an arrangement of an apparatus for adaptive control of a recessing cycle on a grinding machine is shown in FIG. 1. This apparatus comprises a pick-up head 2, which touches a workpiece 1 being machined, a dimensional encoder unit 3, an analysis unit 4, a synthesis unit 5, a removal speed unit 6, a function unit 7, a cycle control unit 8 and a comparator unit 9, which controls action units 10 of the grinding machine.

The output of the pick-up head 2 is connected to an input of the dimensional encoder unit 3. An output of the dimensional encoder unit 3 is connected to the first collecting input 41 of an analysis unit 4, to the first sorting input 91 of the comparator unit 9 and to an input of the removal speed unit 6. An output of the removal speed unit 6 is connected to the second sorting input 92 of the comparator unit 9 and to an input of the function unit 7. An output of the function unit 7 is connected to the third sorting input 93 of the comparator unit 9 and to the second collecting input 42 of the analysis unit 4. An output of the analysis unit 4 is connected to the second pick-up input 52 of the synthesis unit 5 and an output of the synthesis unit 5 is connected both to the first reference input 94 of the comparator unit 9 and to the third collecting input 43 of the analysis unit 4. The first keying input 45 of the analysis unit 4 is connected to the first control output 83 of the cycle control unit 8. The second keying input 46 of the analysis unit 4 is connected to the second control output 84 of the cycle control unit 8. The third keying input 47 of the analysis unit 4 is connected to the third control output 85 of the cycle control unit 8 and the fourth keying input 48 of the analysis unit 4 is connected together with the fifth keying input 55 of the synthesis unit to the fourth output 86 of the cycle control unit 8, the fifth control output 87 of which is connected to a locking input 99 of the comparator unit 9 from which a feedback signal is connected from its first auxiliary output to an auxiliary control input 82 of the cycle control unit 8. The second auxiliary output 105 of the comparator unit 9 is connected to a sampling input 71 of the function unit 7. The first output 101 of the comparator unit 9 is connected to a roughing control input 11 of action units 10 of the grinding machine. The second input 102 of the comparator unit 9 is connected to the cycle end control input 12 of the action units 10 of the grinding machine and the third output 103 of the comparator unit 9 is connected to the finish grinding control input 13 of the action units 10 of the grinding machine. The analysis unit is provided with an order input 44. The synthesis unit is provided with a first auxiliary input 53 and with a second auxiliary input 54. The cycle control unit 8 is provided with a control output 81. The comparator unit 9 is provided with a second reference input 95, a third reference input 96, a fourth reference input 97 and a fifth reference input 98.

The allowance on the workpiece 1 being machined is detected by a pick-up head 2, which transforms it into a measured quantity. This quantity is transformed in the dimensional encoder unit 3 into a form suitable for next processing step. In the removal speed unit 6 a signal proportional to the allowance on the machined workpiece 1 is converted into a signal proportional to the material removal speed. The function unit 7 operates in two phases. First, an input signal proportional to the material removal speed is converted into a signal value at the termination of the roughing operation end. In the second phase the input signal is converted into a signal corresponding with the ordered functional relationship of the instantaneous material removal speed and the material removal speed at the beginning of sparking. In the analysis unit 4 signals picked up during one or several grinding cycles are converted into a signal proportional to the characteristic value or values for the next cycle. The synthesis unit 5 derives a signal proportional to the allowance thickness at which the roughing must be terminated, so that the grinding cycle may be optimized. In the comparator unit 9 signals measured during the working cycle are compared with preselected or derived reference values, and according to the result of the comparison impulses are transmitted into the action units 10 of the grinding machine and back into the proper apparatus. The cooperation and function of individual units in the grinding cycle is organized by the cycle control unit 8, which is controlled both by means of an external input signal fed into the control input 81 and by means of a signal from comparator unit 9 fed onto auxiliary control input 82.

After arrival of the external input signal onto the control input 81, which indicates the beginning of the grinding cycle, the cycle control unit 8 issues on its fourth control output 86 a command signal. This signal supplies to the analysis unit 4 and to the synthesis unit 5 the order to store in their circuits the signal provided at that time by the dimension unit 3 to the first collecting input 41 and to the first pick-up input 51. The stored signal corresponds with the allowance on the machined workpiece 1 at the beginning of the grinding cycle. The synthesis unit 5, after having accepted this order, picks up three signals, namely the signal from the second pick-up input 52 which corresponds with the characteristic value or values, the signal from the first auxiliary input 53 which corresponds with the requested value of the allowance at the end of sparking and the signal from the second auxiliary input 54 which corresponds with the requested functional relationship of the material removal speeds at the beginning and at the end of sparking. From these signals there is derived the value of the allowance for finishing the roughing operation in the synthesis unit 5. And so the preparation of the apparatus is finished. Now the cycle control unit 8 issues a command for unlocking the outputs of the comparator unit 9 by means of the signal on the fifth control output 87.

Simultaneously a roughing part of the grinding cycle takes place. The comparator unit 9 compares the signal on its first sorting input 91, which corresponds with an instantaneous value of the allowance on the machined workpiece 1 with the signal on its first reference input 94, onto which there is fed a signal from the output of the synthesis unit 5 corresponding with the allowance for the termination of the roughing operation. When the comparator units detects equality between these signals, the comparator block 9 sends from its first output 101 a command signal into the input 11 of the roughing control circuit, thereby terminating the roughing operation. Simultaneously a control command is sent from the second auxiliary output 105 into the sampling input 71. After having received this command, the function unit 7 stores in its circuits the signal corresponding with the instantaneous value of the material removal speed and there takes place a transition into the second phase of its function.

During sparking the comparator unit 9 carries out simultaneously several comparisons. Its main tasks is to compare the signal corresponding with the allowance, which is fed to the first sorting input 91, with the reference signal on the second reference input 95, which corresponds with the requested value of the final dimension of the machined workpiece. When equality is detected between these signals, the comparator unit 9 sends from its second output 102 a command signal into the input 12 of the cycle end control, and in this way the grinding cycle is ended.

A secondary task of the comparator unit 9 is an inspection of secondary conditions limiting the function area of the whole apparatus. During this inspection the signal on the second sorting input 92, which is proportional to the instantaneous material removal speed is compared, with the signal on the fifth reference input 98, which is proportional to the minimum allowed material removal speed. Then the signal on the third sorting input 93, which is proportional to the functional relationship of the instantaneous material removal speed and of the material removal speed at the beginning of sparking is compared with the signal on the fourth reference input 98, which is proportional to the limit value of this relationship. The signal on the first sorting input 91 is also compared with the signal on the third reference input 96, which is proportional to the allowance on the machined workpiece 1, at which there is desirable to terminate the sparking. As soon as equality is detected in any of these three comparisons, te comparator unit 9 sends from its third output 103 a command signal into the input 13 of the finish grinding control circuits, and in this way the finishing infeed is started.

By selecting the intensity and ratio of signals on the first auxiliary input 53, on the second auxiliary input 54 and on the third reference input 96 together with the fourth reference input 97, many modifications of the apparatus function may be achieved. A selection of a zero allowance for finish grinding may be considered as a basic modification. Then it is advantageous to select the value of the signal on the fourth reference input 97 as a smaller value than the signal value on the second auxiliary input 54. The difference of these values determines the zone of the allowed inaccuracy in determining the allowance for terminating the roughing. The value of the signal on the third reference input 96 may be either selected as corresponding with zero allowance, or it may be adapted so that it may be possible during this comparison to inspect whether the allowance at the beginning of the grinding cycle is greater than the selected value. In another modification a nonzero value of the allowance for finish grinding is selected. Then it is possible to select the signal value on the fourth reference input 97 identical with the signal value on the second auxiliary input 54, or it is possible to select identical values of signals on the first auxiliary input 53 and on the third reference input 96. The accuracy of the allowance determination for the termination of roughing is then always determined by the difference of the second couple of values.

Independently of whether the sparking is ended by a finishing infeed or by the cycle end, the comparator unit 9 sends a control command from the first auxiliary output 104 into the cycle control unit 8. The cycle control unit 8 immediately provides a command signal from its first control output 83 into the analysis unit 4.

After having received this command signal, the analysis unit 4 stores in its circuits the instantaneous signal value from the first collecting input 41 and from the second collecting input 42. The recorded signal corresponds with the allowance at the end of sparking and with the functional relationship of the material removal speed at the beginning and at the end of sparking.

When the grinding cycle is ended, the external input signal on the control input 81 is terminated as well. The cycle control unit 8 signals this condition and issues on its second control output 84 a command signal, which transmits into the analysis unit an order to record in its circuits the signal from the third collecting input 43, which corresponds with the allowance at the end of the roughing operation. Following this the cycle control unit 8 provides on the second control output 84 an order for deriving the characteristic value or values for the next grinding cycle. In this way the function cycle of the control device is terminated and the device waits for the beginning of the next grinding cycle.

The described function is repeated during each grinding cycle. A little different situation takes place only as to the first grinding cycle, when in the analysis unit 4 there is not at hand the characteristic value or values at the beginning of the cycle. In this case the cycle control unit 8 determines that the first grinding cycle has not yet started, because from the beginning of its function no signal came onto the control input 81. This being determined, the cycle control unit 8 issues on its third control output 85 a command signal into the analysis unit 4. After having received this command, the analysis unit 4 stores in its circuits the signal on the order input 44 and from it a characteristic value or values for the first cycle are derived.

An example of an arrangement of the analysis unit 4 and the synthesis unit 5 for the mathematic model of a recess grinding apparatus mentioned above is shown in FIG. 2. Relations, from which the value of the allowance for terminating the roughing operation the characteristic value are determined, are very similar. That is why the arrangement of the circuits where these operations are carried out are identical. The same circuits may be advantageously time shared, once as functional parts of the analysis unit 4 and at another time as parts of the synthesis unit 5. In the next description it is mentioned that these blocks are united.

Figure 2:
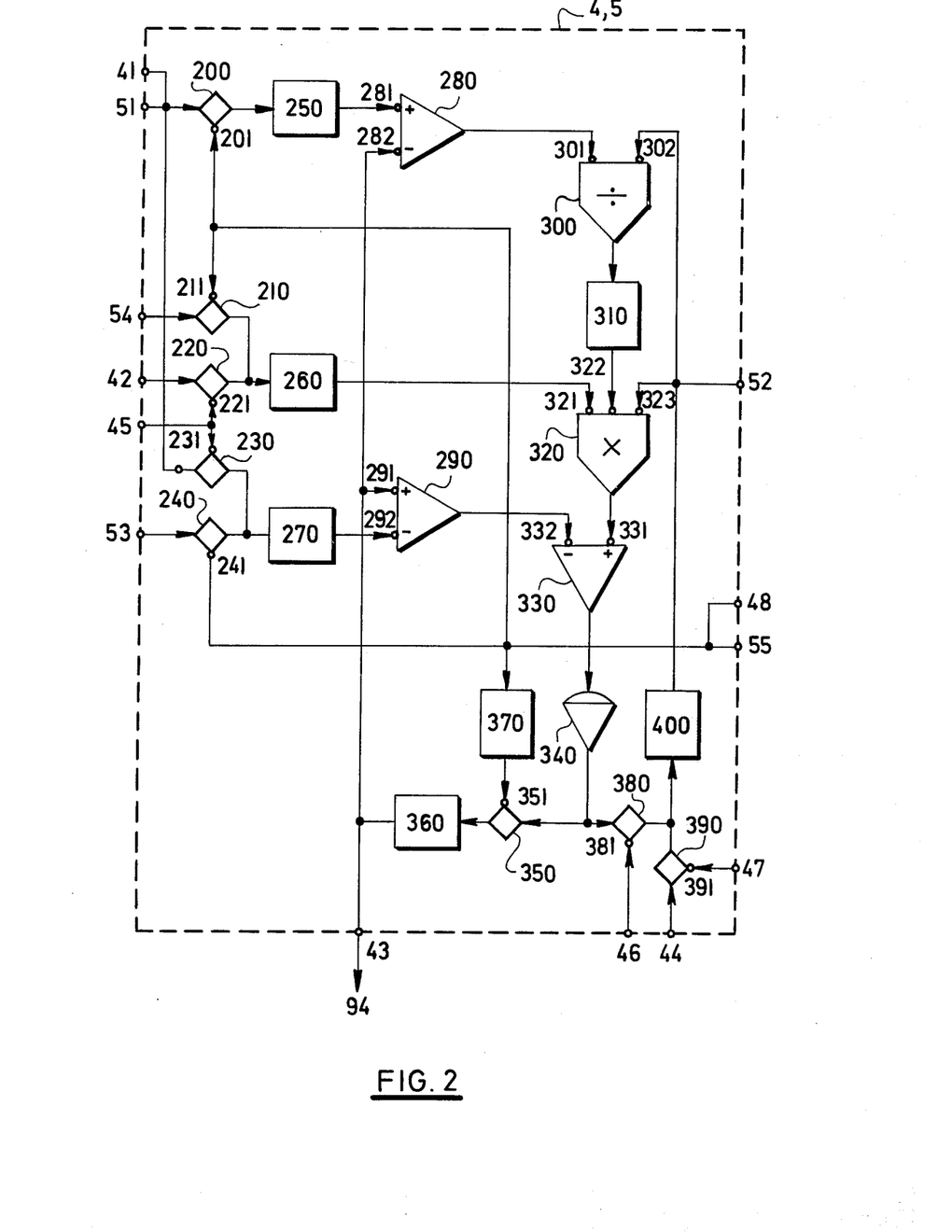
FIG. 2 shows a logic diagram of an analysis unit and a synthesis unit for a mathematical model of a grinding process.

The arrangement comprises the first through the eighth gates 200, 210, 220, 230, 240, 350, 380, 390, the first through the fifth memory units 250, 260, 270, 360, 400, the first through the third subtractor 280, 290, 300, the first divider 300, a multiplier 320, a comparator 340, a function converter 310 and a delaying circuit 370.

In united blocks, viz. in the analysis unit 4 and in the synthesis unit 5 there are connected, to the mutually interconnected first collecting input 41 and first pick-up input 51, both an input of the first gate 200 and an input of the fourth gate 230. To the second auxiliary input 54 there is connected an input of the second gate 210. An input of the third gate 220 is connected to the second collecting input 42. An input of the fifth gate 240 is connected to the first auxiliary input 53. An output of the first gate 200 is connected to an input of the first memory 250. The output of the second gate 210 is connected together with an output of the third gate 220 to an input of the second memory 260. An output of the fourth gate 230 is connected together with an output of the fifth gate 240 to an input of the third memory 270. An output of the first memory 250 is connected to the first positive input 281 of the first subtractor 280 and an output of the first subtractor 280 is connected to the first divisor input 301 of the first divider 300, the output of which is connected to an input of a function converter 310. An output of the function converter 310 is connected to the second multiplying input 332 of a multiplier 320. An output of the second memory 260 is connected to the first multiplying input 321 of the multiplier 320. An output of the third memory 270 is connected to the second negative input 292 of the second subtractor 290 and an output of the second subtractor 290 is connected to the third negative input 332 of the third subtractor 330. An output of the multiplier 320 is connected to the third positive input 331 of the third subtractor 330. An output of the third subtractor 330 is connected to an input of a comparator 340, the output of which is connected both to an input of the sixth gate 350 and to an input of the seventh gate 380. An output of the sixth gate 350 is connected to an input of the fourth memory 360, the output of which is connected both to the second subtractor 290 and to the first negative input 282 of the first subtractor 280 as well as to the third collecting input 43, which serves simultaneously, when uniting the synthesis unit 5 and the analysis unit 4, as an output of the synthesis unit 5. An output of the seventh gate 380 is connected, together with an output of the eighth gate 390 to the input of the fifth memory 400. The input and the gate 390 is connected to the order input 44. The output of the fifth memory 400 is connected back to the first dividend input 302 of the first divider 300 and to the third multiplying input 323 of the multiplier 320 and also to the second pick-up input 52, which serves simultaneously, when uniting the analysis unit 4 and the synthesis unit 5, as an output of the analysis unit 4. The second keying input 46 is connected to the seventh actuation input 381 of the seventh gate 380. The third keying input 47 is connected to the eighth gate 390. The first keying input 45 is connected to the third actuation input 221 of the third gate 220. The fourth actuation input 231 of the fourth gate 230. The fourth keying input 48 and the fifth keying input 55 are connected in common to the first actuation input 201 of the first gate 200 and to the second actuation input 211 of the second gate 210, and also to the fifth actuation input 241 of the fifth gate 240 and to the input of the delaying circuit 370. An output of the delaying circuit 370 is connected to the sixth actuation input 351 of the sixth gate 350.

The function of the united block starts so that before the beginning of the first grinding cycle a command signal passes onto the third keying input 47, which enables the eighth gate 390. In this way the signal from the order input 44, which corresponds with the maximum allowed value of the limit stresses, passes into the fifth memory 400. This fifth memory 400 stores this value and provides it on its output until the next order.

Figure 3:
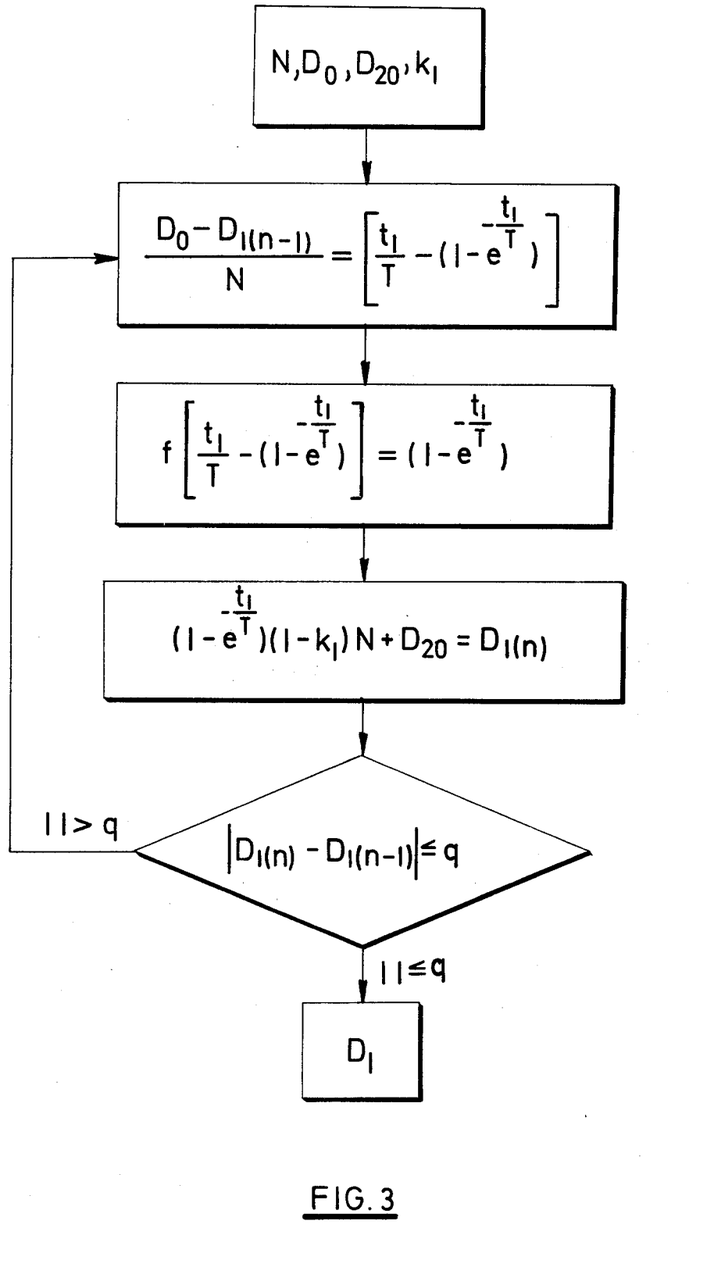
FIG. 3 shows one of possible arrangements of a flow diagram of a computational algorithm for determining the limit of the end of roughing.

At the beginning of the first grinding cycle a command signal passes onto the mutually interconnected keying input 48 and fifth keying input 55. So a command issued to enable the first gate 200, the second gate 210 and the fifth gate 240. Into the first memory 250 there is stored a signal from the mutually interconnected first collecting input 41 and first pick-up input 51, which corresponds with the allowance at the beginning of machining ($D_o$). Into the second memory 260 there is stored a signal from the second auxiliary input 54, which corresponds with the requested ratio of the material removal speed at the end and at the beginning of sparking ($1-k_1$). Into the third memory 270 there is stored a signal from the first auxiliary input 53, which corresponds with the requested allowance at the end of sparking ($D_{20}$). The command signal then passes with an adjusted delay through the delaying circuit 370. Thus a command is issued to enable also the sixth gate 350. By the enabling of the sixth gate 350 there is functionally connected, within the duration of the order signal, the calculation system comprising the first subtractor 280, the first divider 300, the function divider 310, the multiplier 320, the second subtractor 290, the third subtractor 330, the comparator 340 and the fourth memory 360, which solves by means of an iteration method the system of equations (5) and (6). The allowance, at which the roughing operation ($D_1$) must be ended, so that ordered initial conditions may be fulfilled, is in this case the unknown value. The process of the whole calculation may be followed in the flow diagram of a computational algorithm in FIG. 3. The function of the comparator is there represented by means of a block of a conditional decision. $D_1$ ($n-1$), $D_1$ ($n$) represents ($n-1$), and eventually the $n^{th}$ approximation of $D_1$ and q corresponds with the allowed error of the calculation. After the command signal terminates, the calculation system is disconnected and in the fourth memory 360 a signal corresponding with the allowance at the end of the roughing operation ($D_1$) is stored.

Figure 4:
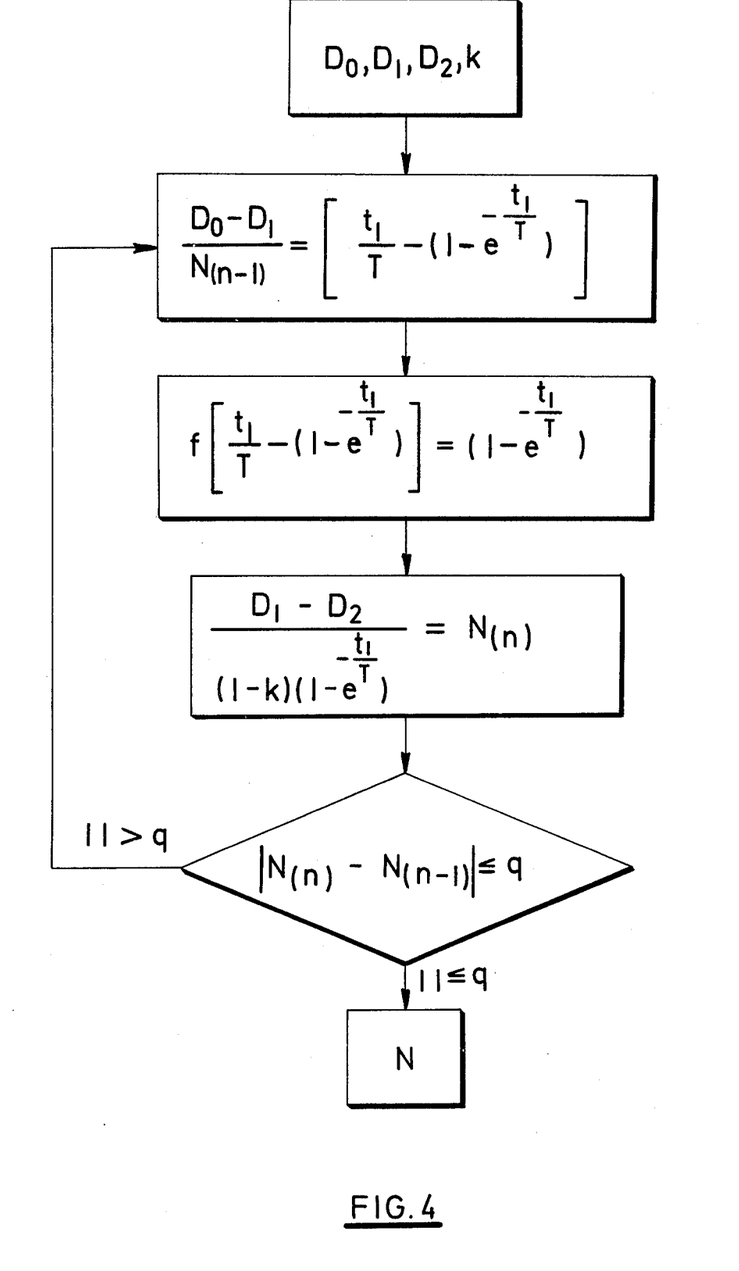
FIG. 4 shows one of possible arrangements of a flow diagram of a computational algorithm for determining limit stresses.

After the ending of sparking a command signal comes onto the first keying input 45. Thus, the command is issued to enable the third gate 220 and the fourth gate 240. The third memory 270 stores a signal from the mutually interconnected first collecting input 41 and first pick-up input 51, which corresponds with the allowance at the end of sparking ($D_2$). The second memory 260 stores a signal from the second collecting input 42, which corresponds with the ratio of the material removal speed at the beginning and at the end of sparking ($1-k$). After the ending of the grinding cycle, a command signal passes onto the second keying input 46 and enables the seventh gate 380. Thus the calculation system for the iterative solution of the system equations (5) and (6) is closed for the duration of the command signal, but in this case the limit stresses (N) are the unknown value. The process of the whole calculation is shown in the flow diagram of the computational algorithm in FIG. 4. The function of a comparator is also represented by a block of a conditional decision. $N_{(n-1)}$, $N_{(n)}$ represents the $(n-1)^{th}$, and eventually the $n^{th}$ approximation of N and q corresponds with the allowed error of the calculation. After the calculation system is disconnected at the end of the command signal, a signal corresponding with limit stresses (N) remains stored in the fifth memory 400.

Limit stresses may be derived also from more cycles and in this way it is possible to increase the accuracy if its adjustment. The determined values of the limit stresses from each cycle, for example, may be stored in separate memories and after the first phase of the calculation is over, the second phase may be carried out, in which the resulting limit stresses are determined either as the mean value or as a mean value of individual limit stresses.

Figure 5:
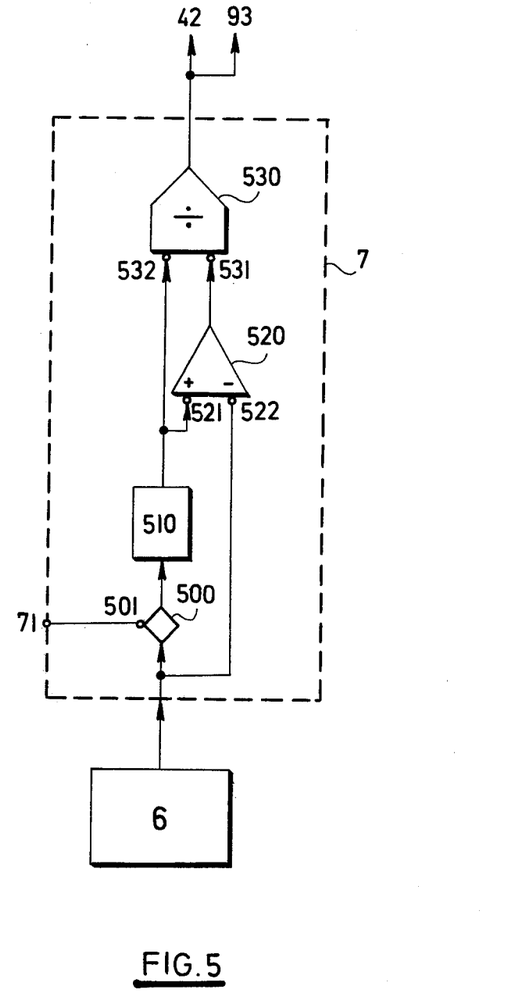
FIG. 5 shows a logic diagram of a function block for a functional relationship of material removal speeds.

An example of an arrangement of the function unit 7 is shown in FIG. 5. The arrangement comprises a ninth gate 500, a sixth memory 510, a fourth subtractor 520 and a second divider 530. Onto the input of the function unit 7, which is connected to the output of the removal speed unit 6, both the fourth negative input 522 of the fourth subtractor 520 and the input of the ninth gate 500 are connected; the output of the ninth gate 500 is connected to the input of the sixth memory 510. The output of the sixth memory 510 is connected both to the second dividend output 532 of the second divider 530 and to the fourth positive input 521 of the fourth subtractor 520, the output of which is connected to the second divisor input 531 of the second divider 530; then the output of the second divider 530 represents the output of the function unit 7, and the sampling input 71 is connected to the ninth actuation input 501 of the ninth gate 500.

The gate 500 is enabled in the first phase of the function of the function unit 7. In this way the signal from the output of the removal speed unit 6 passes into the output of the sixth memory 510. On the output of the fourth subtractor 520 there is a zero value. This causes the output of the second divider 530 to be in an undefinable condition (dividing by zero)-usually outside the working area. This signal is not utilized and it is locked in the next circuits.

After the roughing operation is ended, a command signal, which disables the ninth gate 500, passes onto the sampling input 71. In this way the sixth memory 510 is disconnected from the signal source and a signal corresponding with the material removal speed at the end of the roughing operation, which is identical to the material removal speed at the beginning of sparking, continues being stored and is available on the output of the sixth memory 510. On the output of the fourth adder 520 there is a signal proportional to the difference between the material removal speed at the beginning of sparking and the instantaneous material removal speed. On the output of the second divider 530 there is a signal corresponding with the difference of material removal speeds, divided by a value corresponding with the material removal speed at the beginning of sparking. When sparking terminates, the signal on the output of the second divider 530 is proportional to the quotient of the material removal speeds at the beginning and at the end of sparking and so it corresponds with ($1-k$) of equation (6).

Figure 6:
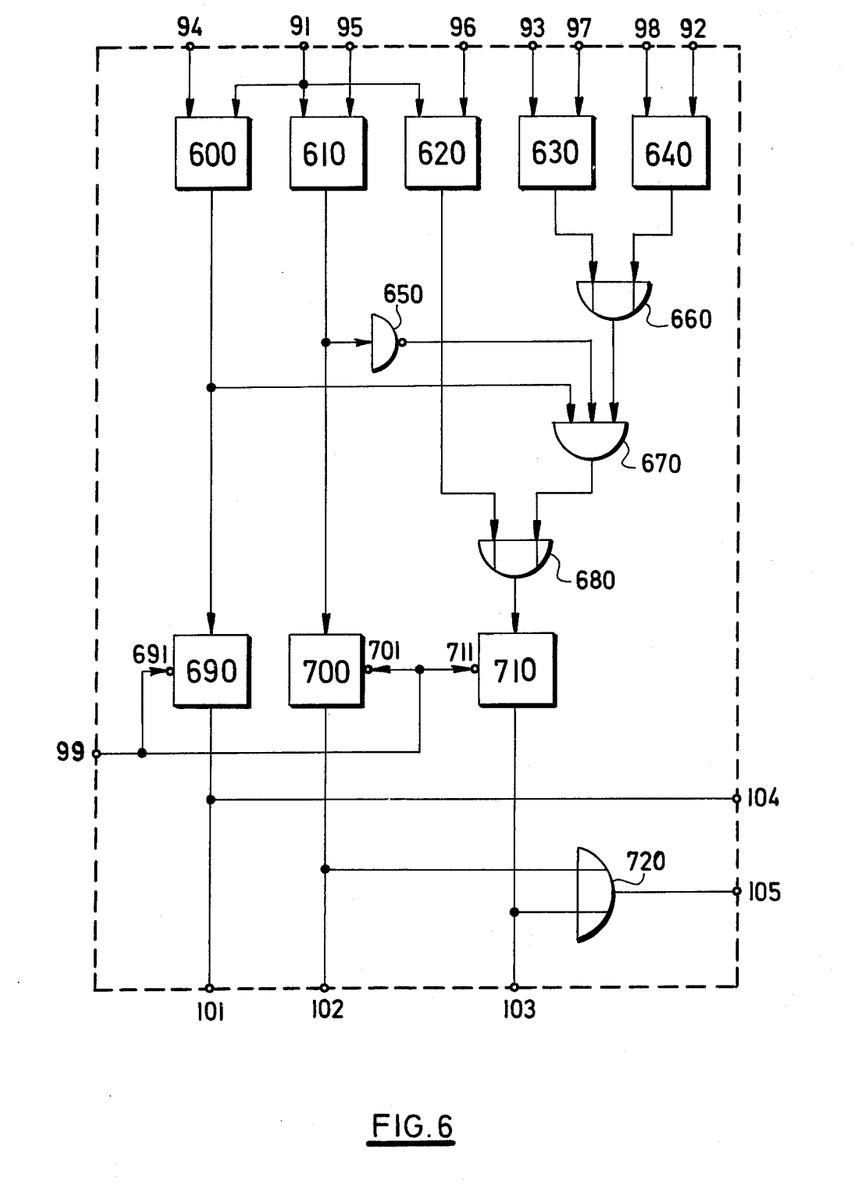
FIG. 6 shows a logic diagram of a comparator unit.

An example of an arrangement of the comparator unit 9 is shown in FIG. 6. An arrangement comprises the first through the fifth sorting circuit 600, 610, 620, 630, 640, the first through the third flip-flop 690, 700, 710, an inverter 650, the first through the third OR gate 660, 680, 720 and an AND gate 670.

The first sorting input 91 is connected to the first through the third sorting circuit 600, 610, 620. The first reference input 94 is connected to the first sorting circuit 600; the second reference input 95 is also connected to the second sorting circuit 610, the third reference input 96 is also connected to the third sorting circuit. To the fourth sorting circuit 630 there is connected both the third sorting input 93 and the fourth reference input 97. To the fifth sorting circuit 640 there is connected both the second sorting input 92 and the fifth reference input 97. The output of the fourth sorting circuit 630 is connected together with the output of the fifth sorting circuit 640 to the inputs of the first OR gate 660, and output of the first OR gate 660 is connected to the input of the AND gate 670; to the second input of the AND gate 670 there is connected the output of the first sorting circuit 600. Sorting circuit 600 is also connected to the input of the first flip-flop 690. To the third input of the AND gate 670 there is connected the output of the inverter 650, the input of which is connected to the output of the second sorting circuit 610. The second sorting circuit 610 is also connected to the input of the second flip-flop 700. The output of the AND gate 670 is, together with the output of the third sorting circuit 620, connected to inputs of the second OR gate 680. The output of the second OR gate 680 is connected to the input of the third flip-flop 710. The output of the first flip-flop 690 is connected both to the first output 101 and to the second auxiliary output 105. The output of the second flip-flop 700 is connected both to the second output 102 and to the input of the third OR gate 720, and the output of the third flip-flop 710 is connected both to the third output 103 and to the second input of the third OR gate 720. The output of the third OR gate is connected to the second auxiliary output 105.

The first through the fifth sorting circuits 600, 610, 620, 630, 640, compare during their function the respective pairs of signals connected to their inputs. A signal, which changes its amplitude between two levels always at the moment when the input signals are equal, is a result of the comparison. Each of the first through the third flip-flops 690, 700, 710 separately change state when they receive the first signal level change from their corresponding sorting circuits and remain at this state even after this signal level change is over. Thus, it is insured so that the first through third output 101, 102, 103 may change during one grinding cycle only once.

The function of the comparator unit 7 starts after the command signal has passed onto the locking input 99. This signal resets the first through the third flip-flop 690, 700, 710, so that they may respond by changing state in response to the level change in the corresponding sorting signal. First, the level change in the sorting output signal is sent by the first sorting circuit 600, on the inputs of which there are signals corresponding with the allowance on the machined part 1 and with the allowance for the end of roughing. The level changes excites the first flip-flop 690, which provides a command signal to the first output 101 and to the first auxiliary output 104. In this way the roughing terminates and the sparking starts. In the next part of the cycle the level change signal is provided by the second sorting circuit 610, or one of the third through the fifth sorting circuits 620, 630, 640, the task of which is to track secondary conditions. If the level change signal is sent by the second sorting circuit 610, on the inputs of which there are signals corresponding with the allowance on the machined workpiece 1 and with the requested value of the final dimension, the second flip-flop 700 changes state and it issues a command signal simultaneously onto the second output 102 and onto the input of the third OR gate 720, and in this way the command signal comes even to the second auxiliary output 105. The third sorting circuit 630 has on its inputs signals corresponding with the allowance and with the requested value of the allowance after the aprking is ended. The fourth sorting circuit 630 has on its inputs signals proportional to the functional relationship of the instantaneous speed of material removal and of the material removal speed at the beginning of sparking and also a signal proportional to the limit value of this relation. The fifth sorting circuit 640 has on its inputs signals corresponding with the instantaneous speed of the material removal and with the minimum allowed speed of the material removal. The level change signals from the fourth sorting circuit 630 and from the fifth sorting circuit 640 are processed in the first OR gate 660, the output of which is fed as an input to the AND gate 670, which permits signals to pass through only if there also are signals on its other inputs. This coupling insures that the function block processes signals derived from the material removal speed only at the time of sparking. In this way the false signals are prevented from passing. In the second OR gate 680 the signal from the output of the AND gate 670 is combined with the level shift signal from the third sorting circuit 620. The resulting impulse from the output of the second OR gate 680 excites the third flip-flop 710, which provides a command signal simultaneously to the third output 103 and to the input of the third OR gate 720, and in this way the command signal comes again even to the second auxiliary output 105.

The mentioned apparatus provides the basic application of the method according to the invention. It is evident, that in an analogous way there may be designed devices, which utilize more characteristic values, which apply a more complicated functional relationship of the material removal speeds at the beginning and at the end of sparking, and which utilize values derived from more grinding cycles for the evaluation of characteristic values.

What we claim is:

1. A method of an adaptive control of a recessing cycle on a grinding machine, the aim of which is to reach ordered geometrical properties of a machined workpiece within a minimum interval comprising the steps of measuring the workpiece to determine its allowance, roughing the workpiece in a first grinding cycle, terminating the first roughing operation if the allowance on the machined part drops to a dimension determined from a characteristic value, and from the allowance at the beginning of the first grinding cycle so, repeating the roughing operation as a second grinding cycle, terminating the second grinding cycle if the allowance on the machined part drops to a value determined from the preceding grinding cycle and from the allowance at the beginning of the second grinding cycle, repeating the second grinding cycle using values determined from a preceding grinding cycle, so that the allowance for finish grinding may have a requested value, measuring the material removal speed at the beginning and at the end of the sparking, attempting to maintain a predetermined functional relationship between the material removal speed at the beginning and the end of sparking, terminating the grinding operation according to the final dimension of the machined part if the predetermined functional relationship is maintained and the material removal speed remains above a preselected speed, finish grinding the workpiece only if the requested function relation of material removal speeds at the beginning and at the end of sparking is not maintained with a preselected accuracy, or if the material removal speed drops under the preselected speed, deriving the characteristic values for the next grinding cycle from the allowance at the beginning of the cycle, from the allowance at the end of roughing, from the allowance at the end of sparking and from the function relation of material removal speeds at the beginning and at the end of sparking if the allowance on the machined part is smaller than a preselected value.

2. A method of an adaptive control as claimed in claim 1, wherein the characteristic value transmitted into at least one next grinding cycle is represented by limit stresses of the system machine tool workpiece.

3. A method of an adaptive control as claimed in claim 2, wherein the functional relationship between the material removal speed at the beginning and at the end of sparking is the ratio of these values.

4. A method of an adaptive control as claimed in claim 2, wherein the step of deriving the allowance value for the end of roughing in the first grinding cycle comprises preadjusting the limit stresses so that the preadjusted value may be greater or equal to the maximum allowed limit stresses.

5. An apparatus for adaptive control of a recessing cycle, comprising a pick-up head touching a machined workpiece, a dimensional encoder unit, a comparator unit and a cycle control unit, means connecting an output of the pick-up head to an input of the dimensional encoder unit, an analysis unit, a synthesis unit, a removal speed determining unit, a function unit, means connecting an output of the dimensional encoder unit to a first collecting input of the analysis unit, to the first pick-up input of the synthesis unit, to a first sorting input of the comparator unit and to an input of the removal speed determining unit, means connecting the output of the removal speed determining unit to a second sorting input of the comparator unit and to an input of the function unit, an output of the function unit being connected to a third sorting input of the comparator unit and to a second collecting input of the analysis unit, an output of the analysis unit being connected to a second pick-up input of the synthesis unit, an output of the synthesis unit being connected both to a first reference input of the comparator unit and to a third collecting input of the analysis unit, a cycle control unit, a first keying input of the analysis unit being connected to a first control output of the cycle control unit, a second keying input of the analysis unit being connected to a second control output of the cycle control unit, a third keying input of the analysis unit being connected to the third control output of the control block, a fourth keying input of the analysis unit being connected together with a fifth keying input of the synthesis unit to a fourth control output of the cycle control unit, a fifth control output of the cycle control unit being connected to a locking input of the comparator unit, a first auxiliary output of the comparator unit being connected as a feedback path to an auxiliary control input of the cycle control unit, a second auxiliary output of the comparator unit being connected to a sampling input of the function unit, a first output of the comparator unit being connected to an input of a roughing control of action units of a grinding machine, a second output of the comparator unit being connected to an input of a cycle end control of the action units of the grinding machine and a third output of the comparator unit being connected to an input of a finish grinding control of the action units of the grinding machine, the synthesis unit being provided with a first auxiliary input and with a second auxiliary input, the analysis unit being provided with an order input, the cycle control unit being provided with a control input and the comparator unit being provided with a second reference input, a third reference input, a fourth reference input and a fifth reference input.

6. Apparatus as claimed in claim 5, wherein the analysis unit and the synthesis unit comprise a single combined, time shared device to which there are connected, the first collecting input and first pick-up input, both an input of a first gate and an input of a fourth gate, the second auxiliary input of the combined device being connected to an input of a second gate, an input of a third gate being connected to the second collecting input of the combined device, an input of a fifth gate being connected to the first auxiliary input of the combined device, an output of the first gate being connected to an input of a first memory, an output of the second gate being connected together with an output of the third gate to an input of a second memory, an output of the fourth gate being connected together with an output of the fifth gate to an input of a third memory, an output of the first memory being connected to a first positive input of a first subtractor, an output of the first subtractor being connected to a first divisor input of a first divider, an output of the first divider being connected to an input of a function converter, an output of the function converter being connected to a second multiplying input of a multiplier, an output of the second memory being connected to a first multiplying input of the multiplier, an output of the third memory being connected to a second negative input of a second subtractor and an output of the second subtractor being connected to a third negative input of a third subtractor, an output of the multiplier being connected to a third positive input of the third subtractor, an output of the third subtractor being connected to an input of a comparator, the output of the comparator being connected both to an input of a seventh gate and to an input of a sixth gate, an output of the sixth gate being connected to an input of a fourth memory, the output of the fourth memory being connected both to a second positive input of the second subtractor and to a first negative input of the first subtractor as well as to the third collecting input, which serves simultaneously for the combined synthesis and analysis apparatus, as an output of the synthesis unit portion, an output of the seventh gate being connected, with an output of the eighth gate, the input of the eighth gate being connected to the order input and to the input of the fifth memory, the output of the fifth memory being connected back to a first dividend input of a first divider and to a third multiplying input of the multiplier and also to the second pick-up input, which serves simultaneously, for the combined analysis and synthesis apparatus, as an output of the analysis unit portion, the second keying input being connected to a seventh actuation input of a seventh gate, the third keying input being connected to an eighth actuation input of an eighth gate, the first keying input being connected to a third actuation input of the third gate and to a fourth actuation input of the fourth gate, mutually interconnected fourth and fifth keying inputs being connected to a first actuation input of the first gate and to a second actuation input of the second gate, and also to a fifth actuation input of the fifth gate and to the input of a delaying circuit, an output of the delaying circuit being connected to a sixth actuation input of the sixth gate.

7. An apparatus as claimed in claim 5 wherein the input of the function block there is connected to a fourth negative input of the fourth subtractor and an input of a ninth gate, an output of the ninth gate being connected to an input of a sixth memory, an output of the sixth memory being connected both to a fourth positive input of the fourth subtractor and to a second dividend input of the second divider, the output of the fourth adder being connected to a second divisor input of the second divider, the output of the second divider serving as an output of the function unit, and a sampling input being connected to a ninth actuation input of the ninth gate.

8. An apparatus as claimed in claimed in claim 5 wherein in the comparator unit an output of the fourth sorting circuit is connected together with an output of the fifth sorting circuit to inputs of a first OR gate, an output of the first OR gate being connected to an input of an AND gate, a second input of the AND gate being connected to an output of the first sorting circuit which is also connected to an input of a first flip-flop, and an output of an inverter being connected to a third input of the AND gate, an input of the inverter being connected to the output of the second sorting circuit, which is also connected to an input of a second flip-flop, an output of the AND gate being connected together with an output of the third sorting circuit to inputs of a second OR gate, an output of the second OR gate being connected to an input of a third flip-flop, an output of the first flip-flop being connected both to the first output and to the first auxiliary output, an output of the second flip-flop being connected to the second output and to the input of a third OR gate, the output of the third flip-flop being connected to the third output and to a second input of the third OR gate, an output of the third OR gate being connected to the second auxiliary output.

* * * * *